(12) United States Patent
Kong et al.

(10) Patent No.: US 8,185,374 B2
(45) Date of Patent: May 22, 2012

(54) MULTI-LANGUAGE COMMUNICATION METHOD AND SYSTEM

(75) Inventors: Wy Mun Kong, Singapore (SG); Siew Lay Lim, Singapore (SG); Chung Yuan Lu, Singapore (SG); Manabu Asano, Hatogaya (JP); Mong Seng Stanley Ng, Singapore (SG); Lay See Shaw, Singapore (SG); Kim Chui Sim, Singapore (SG)

(73) Assignee: Singapore Airlines Limited, Singapore (SG)

( * ) Notice: Subject to any disclaimer, the term of this patent is extended or adjusted under 35 U.S.C. 154(b) by 1024 days.

(21) Appl. No.: 10/540,920

(22) PCT Filed: Jan. 10, 2003

(86) PCT No.: PCT/SG03/00006
§ 371 (c)(1),
(2), (4) Date: Jun. 29, 2005

(87) PCT Pub. No.: WO2004/059522
PCT Pub. Date: Jul. 15, 2004

(65) Prior Publication Data
US 2006/0095249 A1    May 4, 2006

(30) Foreign Application Priority Data
Dec. 30, 2002  (SG) ................ 200207849-1

(51) Int. Cl.
*G06F 17/28* (2006.01)
*G06F 17/20* (2006.01)

(52) U.S. Cl. .......... 704/3; 704/2; 704/7; 704/8
(58) Field of Classification Search .......... 704/3, 7, 704/4, 5, 6, 8
See application file for complete search history.

(56) References Cited

U.S. PATENT DOCUMENTS
5,152,003 A * 9/1992 Poch ................ 455/18
5,388,146 A   2/1995 Morduch et al.
(Continued)

FOREIGN PATENT DOCUMENTS
EP    574147 A    12/1993
(Continued)

OTHER PUBLICATIONS
Confidentially Agreement between SIA and Matsushita Avionics Systems Corporation, Jul. 25, 2001.
(Continued)

*Primary Examiner* — Talivaldis Ivars Smits
*Assistant Examiner* — Jesse Pullias
(74) *Attorney, Agent, or Firm* — Sughrue Mion, PLLC (57) ABSTRACT

The invention provides a multi-language communication method, comprising: providing to each of the persons access to a plurality of language options; receiving from each of one or more of the persons an indication of a respective choice of language chosen by the respective person from the language options; storing the language choices in a database; and making the language choices accessible by one or more applications so that the applications can when operated selectively provide output to each respective person in the respective language choice.

41 Claims, 4 Drawing Sheets

U.S. PATENT DOCUMENTS

| | | | |
|---|---|---|---|
| 5,959,596 A | 9/1999 | McCarten et al. | |
| 5,966,685 A | 10/1999 | Flanagan et al. | |
| 5,978,754 A * | 11/1999 | Kumano | 704/3 |
| 5,982,448 A * | 11/1999 | Reyes | 348/552 |
| 6,204,885 B1 * | 3/2001 | Kwoh | 348/564 |
| 6,205,418 B1 * | 3/2001 | Li et al. | 704/8 |
| 6,240,170 B1 * | 5/2001 | Shaffer et al. | 379/142.15 |
| 6,356,874 B1 * | 3/2002 | Ohrn | 705/6 |
| 6,434,518 B1 * | 8/2002 | Glenn | 704/3 |
| 6,760,411 B2 * | 7/2004 | Dybedokken et al. | 379/88.06 |
| 2002/0135515 A1 * | 9/2002 | Rankin et al. | 342/385 |
| 2003/0065504 A1 * | 4/2003 | Kraemer et al. | 704/8 |
| 2004/0033478 A1 * | 2/2004 | Knowles et al. | 434/350 |

FOREIGN PATENT DOCUMENTS

| | | |
|---|---|---|
| GB | 2298544 A | 9/1996 |
| WO | WO 01/88704 A1 | 11/2001 |

OTHER PUBLICATIONS

Airfax2000 web page from Airfax's website.
Matsushita Avionics Systems Corporation news release "Interactive vol. 4, Issue/First Quarter 2002".
Matsushita Avionics Systems Corporation's fax, Apr. 11, 2002.
Letter from clients referenced LD/MASC/6237, Apr. 18, 2002 to Matsushita Avionics Systems Corporation.

* cited by examiner

MULTI-LANGUAGE COMMUNICATION METHOD AND SYSTEM

FIELD OF THE INVENTION

The present invention relates to a multi-language communication method and system for communicating with and making announcements to a group of people, of particular but by no means exclusive application in communicating with aircraft passengers.

BACKGROUND OF THE INVENTION

With increased international travel, many carriers, particularly airlines, have placed great emphasis on the language expertise of their attendants. Airlines are particularly sensitive to differing passenger profiles, which vary according to route and season, and attempt in many cases to concentrate cabin attendants with particular language skills on flights to and from the corresponding destination. For example, an airline based in an English speaking country but flying into or out of Italy might endeavour to ensure that all cabin attendants speak Italian.

Further, announcements broadcast over the public address system within an aircraft are commonly repeated in multiple languages. For a carrier based in an English speaking country, these might be English, the language of the place of origin of the flight and the language of the destination of the flight. Some countries, on the other hand, have more than one national language, and all such announcements will generally be repeated in each of these.

However, most airlines have insufficient crew or attendants with foreign language expertise to handle both the numbers of passengers with foreign language demands and the diversity of those foreign languages. In some cases this difficulty is exacerbated by hiring criteria which limit the pool of adequately qualified crew and attendants, as language ability is only one recruitment criterion amongst many.

In addition, many passengers (particularly if elderly or infrequent travelers) are hesitant to seek assistance, whether by pressing a "call button" and attracting the attention of fellow passengers or otherwise, even if adequate language support is available. They may be embarrassed by what they see as calling attention to themselves, or as demanding more than they are entitled to.

Further, playing announcements in multiple languages over the public address system annoys some passengers, who must wait until all the languages versions are complete before they can return to reading, working or partaking of in-flight entertainment. In addition, foreign-language speaking passengers may feel that they are accorded a lower priority, being informed in their native language only after the principal language version (such as the English version) and possibly other foreign-language versions have been completed.

SUMMARY OF THE INVENTION

The present invention provides a multi-language communication method, comprising:
  providing to each of said persons access to a plurality of language options;
  receiving from each of one or more of said persons an indication of a respective choice of language chosen by said respective person from said language options;
  storing said language choices in a database; and
  making said language choices accessible by one or more applications so that said applications can when operated selectively provide output to each respective person in the respective language choice.

Preferably those of said persons who do not choose a language are assigned a language choice being a principal language.

The principal language is simply a default language, and will usually be a national language of the carrier on which the passengers are travelling.

Preferably said application is an announcement system for making an announcement in the form of a public announcement over a public address system in a principal language; and
  making said announcement available to each person who has indicated a language choice in the form of a personal announcement over a respective personal address system in said respective language choice;
  whereby a respective person who has chosen a language can access said personal announcement in their respective language choice by means of their respective personal address system.

In one embodiment, said application is an announcement system for making an announcement in the form of a public announcement by means of a public announcement system, wherein said announcement is presented by means of said public announcement system in at least each language choice.

Thus, the public announcement system could be a public address system with audio output, an electronic display, a combination of both, or any suitable alternative. The announcement can be made once per chosen language, even if more than one person has chosen a particular language. This avoids redundant repetition of the announcement.

For example, if there are 25 passengers and 10 choose Chinese, 8 choose English and 7 choose Japanese, an in-flight safety announcement or video presentation would be played once in Chinese, once in English and once in Japanese, that is, just enough languages to accommodate all passengers. The principal language would generally be included, even of not actually chosen by one or more passengers.

The present invention provides a multi-language communication method for making an announcement to a plurality of persons, comprising:
  providing to each of said persons access to a plurality of language options;
  receiving from each of one or more of said persons an indication of a respective choice of language chosen by said respective person from said language options;
  making said announcement in the form of a public announcement over a public address system in a principal language; and
  making said announcement available to each person who has indicated a language choice in the form of a personal announcement over a respective personal address system in said respective language choice;
  whereby a respective person who has chosen a language can access said personal announcement in their respective language choice by means of their respective personal address system.

In one embodiment, the plurality of persons are passengers, such as in an aircraft.

Thus, the principal language could be an official language of the country of origin of the majority of the persons or, in the case of an group of aircraft passengers, the country of origin of the airline. In some cases, there may be a plurality of principal languages (such as where the country of origin has more than one official language), in which case the public announcement can comprise the announcement repeated in more than one language.

Preferably the method includes making said respective language choices accessible by an attendant so that said attendant can anticipate the language needs of a respective person.

Preferably the personal announcement comprises a prerecorded audio translation of the announcement in the respective language choice of a respective person, played over one or more personal loudspeakers located proximate said respective person.

More preferably the personal announcement comprises a prerecorded audio translation of the announcement in the language choice of a respective person, accessible by means of a headphone or ear-piece output allocated to said respective person, whereby said respective person can access said personal announcement by means of a headset connected to said output.

Alternatively, the announcement is an audio announcement and the method includes translating said announcement by real-time computer translation into the respective language choice of a respective person to form the personal announcement, and playing said personal announcement over one or more personal loudspeakers located proximate said respective person.

In one embodiment the personal announcement comprises a prerecorded text translation of the announcement in the language choice of a respective person, accessible by means of a display allocated to said respective person, whereby said respective person can read said personal announcement on said display.

Alternatively, the announcement is a text announcement and the method includes translating said announcement by real-time computer translation into the respective language choice of a respective person to form the personal announcement, and making said personal announcement accessible by means of a display allocated to said respective person, whereby said respective person can read said personal announcement on said display.

Thus, as the principal announcement is being made over a public address system (such as a set of loudspeaker in an aircraft cabin), those who have selected a language can listen to the same announcement (preferably simultaneously) in their language choice through their headset, or read the personal announcement on the display, or both. Translations can be performed in advance (particularly for standard announcements), or by means of real-time translation software (particularly for non-standard announcements).

Preferably the method also includes making said announcement available to each of said persons who has not indicated a language choice in the form of a personal announcement over a personal address system in said principal language.

Thus, those who do not select a language can still listen to the announcement by means of, for example, a headset but in the principal language.

Preferably said language options are provided to each of said persons by means of a console having a display (such as a screen) and a data entry device (such as a keypad and/or touch-sensitive portions of a display), configured to allow each respective person to select said language option.

Preferably the console also provides access to a plurality of predefined service request options, so that each of said persons can request the corresponding service by means of said console.

Preferably said one or more persons who have indicated a language choice are presented with said service request options in the respective language choice, and each of said persons who has not indicated a language choice are presented with said service request options in said principal language.

Thus, a person (such as a passenger) may wish to request one of any number of possible services: for example, that an attendant attend them, that a (particular) drink or item of food be provided to them, that they are unwell, that they require a blanket, that a companion is unwell, or that do not wish to be disturbed.

Preferably the method also includes providing one or more personal messages to a respective one of said persons by means of said console, said messages being displayed in said language choice where said respective person has indicated such a language choice and in said principal language where said respective person has not indicated such a language choice.

In one embodiment, the method includes receiving from a respective one of said persons an indication of a temporary choice of language chosen by said person from said language options and applicable to a secondary location, and making said personal announcement over a personal address system in said secondary location in said temporary language choice.

Thus, the secondary location could be a rest-room in, for example, an aircraft. The person can indicate a language choice applicable to the rest-room, so that announcements made while that person is in the rest-room will be provided to that person in their language choice. The choice of language could be made in the rest-room, or previously (such as from that person's seat). Indeed, the temporary choice can be made in (or when approaching or just outside) the rest-room by the person's providing identification information (such as a seat number), wherein the method includes setting the temporary language choice to be that person's language choice.

Preferably the method includes setting the temporary language to be the principal language if said person does not indicate a temporary choice of language.

The method may also include providing the secondary location with reset means (such a button or switch coupled to an announcement control system) so that the temporary language can be reset to the principal language.

The present invention also provides a multi-language communication system for making an announcement to a plurality of persons, comprising:
  a database for storing a respective language choice of each of said persons;
  a public address system for making said announcement in the form of a public announcement in a principal language; and
  a plurality of personal address systems, each for making said announcement available to a respective person in the form of a personal announcement in the respective language choice of that respective person;
  a control system operable to select each of said personal announcements on the basis of said public announcement and said language choices, and to direct select each of said personal announcements to the corresponding personal address system of each respective person;
  wherein said language choice of a respective person comprises said principal language where said person has not indicated a language choice, whereby each of said persons can access said personal announcement in their respective language choice.

Preferably said system includes a real-time translation module (such as a server provided with real-time translation software), for providing any one or more of: text to text, text to voice, voice to voice, and voice to text real-time translation, so that said system can provide real-time translations of said announcement.

Thus, content (for example, the personal announcements) can be prepared from the announcement in real time if desired. This module can also be used to translate other content, including messages from one or more of the plurality of persons.

Preferably said respective language choices are accessible by an attendant so that said attendant can anticipate the language needs of a respective person.

In one embodiment, the system includes a plurality of input devices, each allocated to a respective one of said persons, operable to input said respective language choice and to convey said choice to said database.

Thus, the language choice can be made on an aircraft from a passenger's seat.

Preferably the system is operable centrally to be input with a language choice of each of one or more of said persons, so that a system administrator can enter said languages choices.

Thus, a passenger, for example, could indicate a language choice when buying a ticket or obtaining a seat allocation, and this choice could be stored on behalf of the person (though the choice would preferably be overrideable by the passenger once in the aircraft). The default language choice would, as above, be the principal language.

Preferably the system includes a prerecorded audio translation of the announcement in each available language choice, and is configured to play the appropriate audio translation corresponding to the respective language choice of a respective person over one or more personal loudspeakers located proximate said respective person.

More preferably the system includes a prerecorded audio translation of the announcement in each available language choice, and is configured to direct said personal announcement to headphone or ear-piece output allocated to said respective person, whereby said respective person can access said personal announcement by means of a headset connected to said output.

Alternatively, the system includes a real-time translation module operable to prepare an audio translation of said announcement in each chosen language, said system being configured to play the appropriate audio translation corresponding to the respective language choice of a respective person over one or more personal loudspeakers located proximate said respective person.

Preferably the system includes a prerecorded text translation of the announcement in each available language choice, and is configured to display the appropriate text translation corresponding to the respective language choice of a respective person on a display allocated to said respective person.

Alternatively, the system includes a real-time translation module operable to prepare a text translation of said announcement in each chosen language, said system being configured to display the appropriate text translation corresponding to the respective language choice of a respective person on a display allocated to said respective person.

In one embodiment, the system includes both audio and text translations of said announcement, and is operable to play a respective audio translation and display a respective text translation to a respective person.

Preferably the system includes for each of said persons a console for providing said language options said respective person, said console having a display (such as a screen) and a data entry device (such as a keypad and/or touch-sensitive portions of a display), wherein said console is configured to allow each respective person to select said language option.

Preferably the console also provides access to a plurality of predefined service request options, so that each of said persons can request the corresponding service by means of said console.

The present invention still further provides a multi-language communication method for communicating with a plurality of passengers, comprising:
providing to each of said passengers access to a plurality of language options;
receiving from each of one or more of said persons an indication of a respective choice of language chosen by said respective person from said language options; and
providing to each of said passengers who has chosen a language access to content in his or her respective language of choice.

Preferably the method includes providing to each of said passengers who has not chosen a language access to content in a principal language.

The content may be promotional material, educational material, entertainment, safety announcements, subtitles for movies, closed captioning, or otherwise, and could be provided by means of, for example, a visual display, an audio output device (such as a headset), or both. Thus, a carrier (such as an airline) can provide passengers with information or other content in each passenger's language of choice.

Preferably the method includes making said respective language choices accessible by a passenger attendant so that said attendant can anticipate the language needs of a respective passenger.

Preferably the method includes providing at least one announcement to each of said passengers by means of a personal address system, wherein said announcement is in the respective language of choice of each passenger or, or, if no language was chosen by a respective passenger, in said principal language.

The announcement can be a text announcement displayed for each respective passenger on a display assigned to that respective passenger.

The announcement can be an audio or audio announcement directed for each respective passenger to an audio output assigned to that respective passenger, whereby each passenger can listen to said announcement, such as by means of a headset. More preferably the method includes making said announcement in the form of a public announcement in said principal language over a public address system.

The present invention still further provides a multi-language communication system for communicating with a plurality of passengers, comprising:
a database for storing a respective language choice of each of said passengers;
a control system operable to retrieve said language choices from said database and operable to provide each of said passengers with access to content in his or her respective language of choice or, if no language was chosen by a respective passenger, in a principal language;
a plurality of output devices, each assigned to a respective passenger for providing said content to said respective passenger in his or her respective language of choice or, if no language was chosen by a respective passenger, in a principal language.

Preferably said respective language choices are accessible by a passenger attendant so that said attendant can anticipate the language needs of a respective passenger.

Preferably said output device is a display, an audio output device (such as a headset), or both.

The system preferably includes a plurality of consoles, each assigned to a respective passenger and operable by said passenger to make their respective language choice from a plurality of language options, and to communicate said respective language choice to said database.

Preferably the system includes a plurality of personal address systems, each assigned to a respective passenger for providing at least one announcement to each of said passengers, wherein said announcement is in the respective language of choice of each passenger or, or, if no language was chosen by a respective passenger, in said principal language.

The announcement can comprise visual material (such as text or text mixed with graphical elements) displayable for each respective passenger on a display assigned to that respective passenger.

The announcement can be an audio announcement directed for each respective passenger to an audio output assigned to that respective passenger, whereby each passenger can listen to said announcement, such as by means of a headset. More preferably the system includes a public address system for making said announcement in the form of a public announcement to said passengers in said principal language.

Preferably said system is operable to receive said language choices from an operator who has received the respective language choices from one or more of the passengers.

Thus, language choices could be provided at check-in and loaded into the database for later access by the control system or attendants.

BRIEF DESCRIPTION OF THE DRAWINGS

In order that the present invention may be more clearly ascertained, a preferred embodiment will now be described, by way of example, with reference to the accompanying drawings, in which.

DETAILED DESCRIPTION

Figure 1:
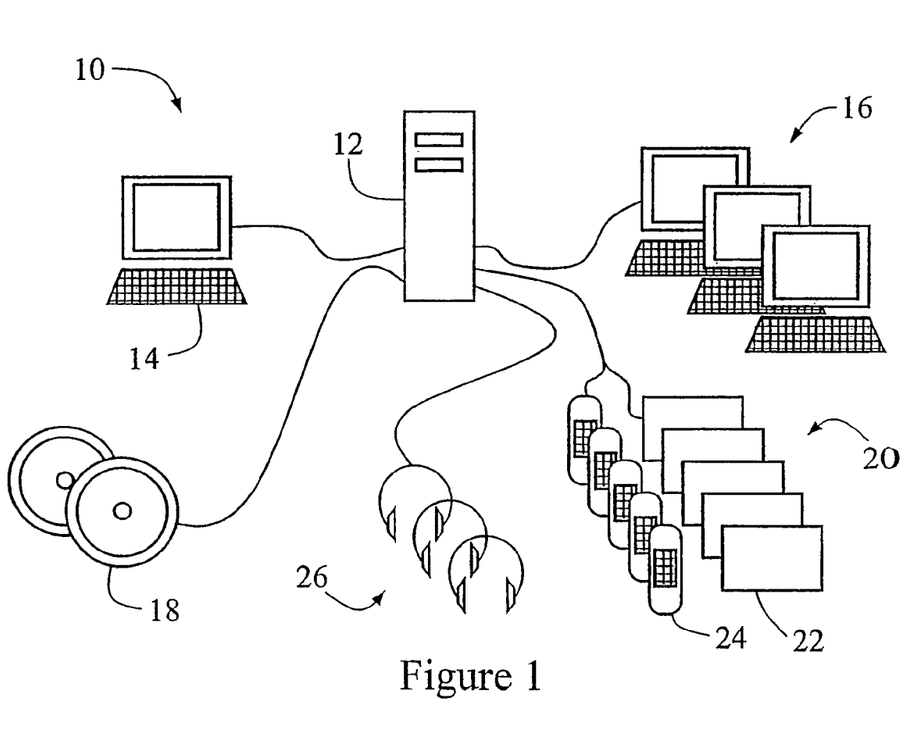
FIG. 1 is a schematic diagram of an in-flight multi-language announcement system according to a preferred embodiment of the present invention.

An in-flight multi-language announcement system according to a preferred embodiment of the present invention is shown schematically at 10 in FIG. 1. The system 10 includes a headend server 12, a cabin management terminal 14 for operating and accessing server 12, a plurality of galley terminals 16 (principally for receiving food and drink requests), and a public address system 18 to allow cabin crew to make announcements throughout the aircraft cabin to the passengers (whether "live" or translated in real-time by translation software on server 12 into one or more chosen languages) and to broadcast prerecorded announcements to the passengers.

It should be noted that galley terminals 16, although principally intended to provide communication with galley personnel as necessary for performing their tasks, are provided with full cabin management terminal functionality. This functionality can be used if required, such as if cabin management terminal 14 is malfunctioning or, for some reason, inaccessible. In addition, each galley terminal 16 can optionally be provided with any other desired application software.

System 10 also includes a plurality of personal seat monitors 20, one assigned to each passenger, each comprising a display 22 and a control console 24. Each display 22 can be operated by a means of its corresponding console 24. Each display 22 is optionally a "touch-screen" display and, if so, many of its functions can additionally be operated by touching the appropriate portion of the display.

Furthermore, system 10 includes a plurality of personal audio outputs 26 (typically an audio jack), one for each passenger, so that each passenger can connect a headset to the audio output in order to listen to music, movie soundtracks or other audio content.

Figure 2:
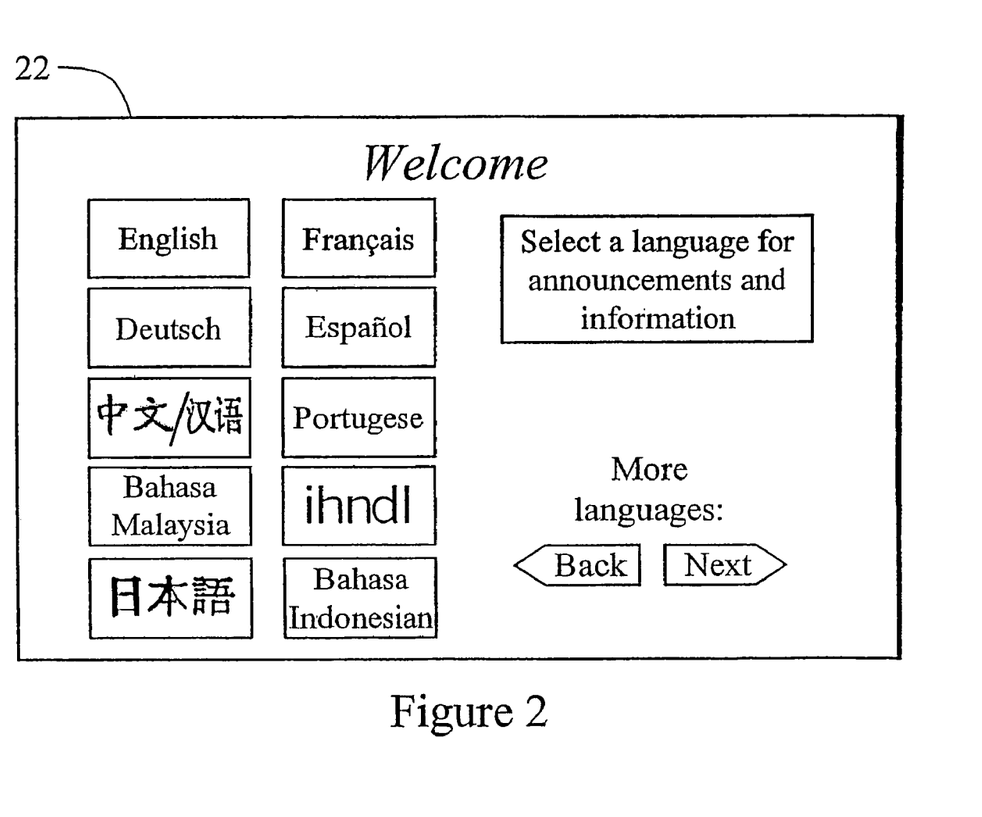
FIG. 2 is a view of the personal display of the system of FIG. 1, displaying a language option menu.

Referring to FIG. 2, when a passenger first activates his or her monitor 20, the passenger is presented on his or her display 22 with a list of available language options. These options or in written form in the appropriate language and script in each case.

The passenger selects the preferred language option either by means of his or her console 24 (or, if a touch-screen display is provided, by touching the relevant portion of display 22), and this language choice is then communicated to and stored in a database in server 12. This database records the language choice against the seat allocation from which the language choice was received. Those passengers who do not chose a language are assigned as a default the principal language of the flight, commonly English but dependent on the country in which the airline is based. However, such passengers (and, indeed, passengers who have chosen a language) can return to the list of language options shown in FIG. 2 at any time, and either choose a language as described above or update an earlier choice of language by essentially the same method.

Thereafter, announcements and other language-dependent material accessible by means of monitor 20 and displayable on display 22 are customized to the respective language choice of each passenger. This also includes instructions and the like displayed on each display 22 and transmitted to each audio output 26 concerning the use of the monitors 20 and the other facilities on the aircraft.

Thus, in-flight content, such as entertainment, information or promotional material, commonly includes audio or text components. These text components can be, for example, information about the aircraft, services available on the aircraft or offered by the airline, safety, travel destinations or meal menus. These text components are displayed in each case on display 22 in the language choice of the respective passenger. This is accomplished by providing server 12 with multiple versions of each piece of content, each in one of the language options available to the passengers, including the principal language.

Alternatively, however, server 12 can be provided with a single master version of each piece of content (typically in the principal language); the master version of a requested piece of content is then translated in real-time by the aforementioned translation software on server 12 into the chosen language of each respective passenger to whom the content is to be delivered.

Other material or content may not normally have a text component but might have an optional text component. Such material includes movies, television programs, instructions items and other audiovisual entertainment, in which sub-titles may optionally be requested. If a passenger has selected, for example, Chinese and a particular movie—though otherwise available—is unavailable in a Chinese version, then an available version (such as English) will be displayed when requested by the passenger, but with Chinese sub-titles. Alternatively, if a Chinese version is available, the selection of a particular movie by a passenger who has previously indicated Chinese as their language of choice will automatically prompt the Chinese version to be played.

These multiple versions of lengthier content may be stored in any suitable form. In this embodiment they are stored in digitized form on server 12, or alternatively on magnetic or optical media playable on a suitable reader (such as a VCR, a DVD player, a PC with CD or DVD drive or a CD or DVD drive in server 12) that is controllable by server 12, and whose outputs are selectively couplable to each monitor 20.

Public announcements (i.e. those broadcast over the public address system 18, which can include a large, shared screen for displaying visual content), which include important safety announcements and information concerning imminent arrival at the destination, are broadcast in the principal language over the public address system 18 and in the respective language choice of each passenger over the respective audio output 26 of each passenger. Visual versions of such announcements (comprising text and/or graphical material) may additionally be displayed on each passenger's corresponding visual display 22, with any text component in each respective passenger's chosen language. Consequently, each passenger can listen to such content by means of a headset plugged into his or her audio output 26 (and optionally view the visual version). For example, a safety announcement might be in English when broadcast over the public address system 18, but be heard simultaneously in Japanese through a headset plugged into the audio output 26 of a particular passenger that has chosen Japanese. The text of the announcement can optionally be displayed in Japanese on that particular passenger's display 22.

It may optionally be desired, despite the above facility, to ensure that the most important announcements are available to all passengers by means of the public address system 18. Some passengers, for example, may not be wearing their headset early in a flight. If so, such important announcements can be repeated just enough times so that a version in every language actually chosen by any passenger is played. Alternatively, multiple language versions of the same announcement can be displayed simultaneously on a suitable screen or screens visible to all. In either case, the required number of versions will almost always be many fewer than the number of passengers. The principal language version will generally either have been chosen by at least one passenger or assigned to at least one passenger (through their not choosing a language), so a version of the announcement in the principal language will also be played. However, it will generally be desirable to play the principal language version even if no one chooses or is assigned the principal language.

It should also be noted that this can also be done in the airport, such as at the gate where passengers are waiting to board. If the language choices have been made earlier (such as at check-in), as will be discussed below, announcement made to the gate area can be repeated in all requisite languages.

Figure 3:
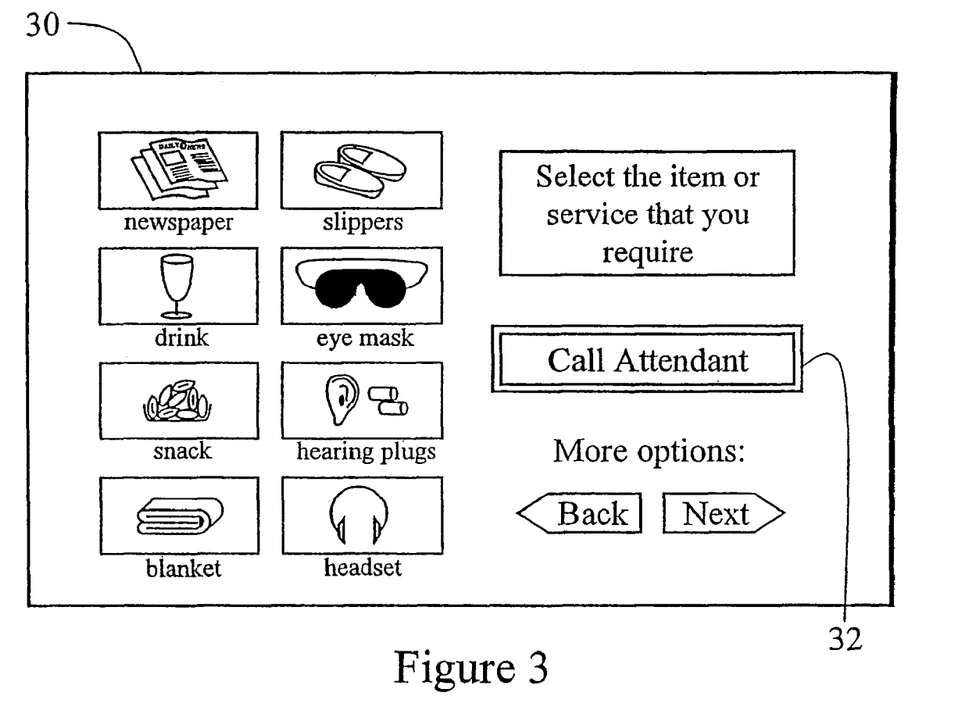
FIG. 3 is a view of the personal display of the system of FIG. 1, displaying a menu of items that can be ordered from a cabin attendant.

Each passenger may also communicate with a cabin attendant by means of a further screen displayable on that passenger's respective display 22. Referring to FIG. 3, a passenger can use his or her respective console 24 to display on display 22 as screen 30 a list of items and services that can be requested from a cabin attendant. This screen 30, though illustrated with English text in FIG. 3, is in the chosen language of the respective passenger. Thus, using either console 24 or by touching the relevant portion of the display 22, the passenger can request items such as a newspaper, a pair of slippers, a drink, a snack, etc. In addition, screen 30 includes a "Call Attendant" field 32 which, when touched by the passenger or selected by means of the passenger's console 24, operates in the same manner as the passenger's call button to summon an attendant.

Figure 4:
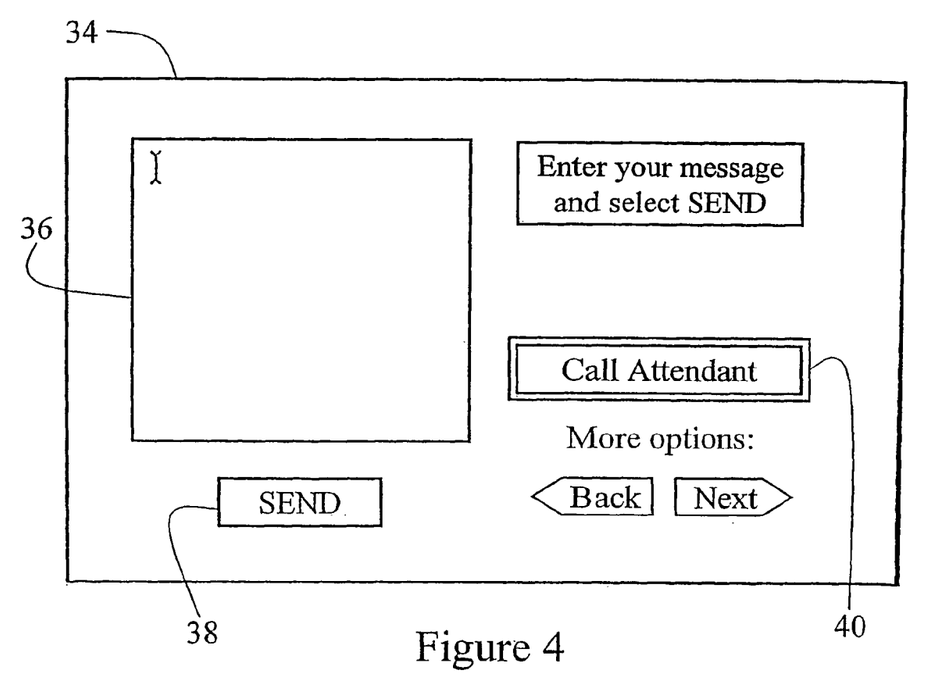
FIG. 4 is a view of the personal display of the system of FIG. 1, displaying a free-text field for sending a message to a cabin attendant.

Referring to FIG. 4, in much the same way, a passenger can display screen 34 on his or her display 22. The instructions in screen 34 are in again the chosen language of the passenger (though, by way of example, in English as shown in FIG. 4). Screen 34 includes a free-text field 36, in which the passenger can enter text by means of that passenger's console 24, in the passenger's chosen language. This may, in some embodiments, be limited by the number of characters that can be produced by means of the keys of console 24. Optionally, console 24 can be provided with a microphone so that the passenger can dictate text to be entered into free-text field 36, whereby the words spoken by the passenger are converted into text by means of speech recognition software resident on server 12.

Once the required text has been entered into free-text field 36, the passenger activates (by touching or using console 24) the SEND button 38 to transmit the message in free-text field 36. Screen 34 also includes a "Call Attendant" field 40.

With both screen 30 and screen 34 of FIGS. 3 and 4 respectively, when a passenger submits a request for an item or service, sends some free-text or summons an attendant, the passenger's monitor 20 transmits the relevant request to the most appropriate destination. Thus, if a passenger requests a snack by means of screen 30, that request is sent to a galley terminal 16 in the galley responsible for that passenger. Although the passenger views screen 30 in their chosen language, the request appears on the gallery terminal 16 in the principal language so that it can readily be interpreted by the relevant member of the cabin crew.

On the other hand, free-text entered in field 36 is sent to and displayed on cabin management terminal 14, having first been translated by means of the aforementioned translation software on server 12 into the principal language. For example, a French speaker might can send a free text request reading "please wake me an hour from our destination" in French, but this request will be displayed on cabin management terminal 14 in the principal language, such as English. The cabin attendants need not necessarily, therefore, speak the passenger's language (in this example, French).

Similarly, a cabin attendant can operate cabin management terminal 14 or a galley terminal 16 to send free-text messages and certain pre-programmed messages (both audio and in text form) to one of more selected passenger monitors 20 and/or audio outputs 26. If in the form of free-text, the message is translated by means of translation software on server 12 into the chosen language of each respective passenger before being displayed on their displays 22. If selected from a menu of prerecorded text or audio messages, the appropriate language version is transmitted to the respective display 22 and/or audio output 26. Importantly, therefore, the cabin attendant does not have to consider the language spoken by each passenger, as this is handled automatically by server 12 when forwarding the appropriate message or announcement.

Although, as discussed above, each passenger is responsible choosing and entering their preferred language, this information can be input by cabin attendants through cabin management terminal 14. This might be desired if, for example, a cabin attendant becomes aware that a particular passenger has been unable to operate his or her monitor 20 or has forgotten to do so. Indeed, this task can also be performed by ground crew through the booking, check-in or seat allocation systems. For example, a passenger could be asked, when booking a ticket, what the preferred language would be for announcements and the like in-flight, and the response can be entered into a central database. The relevant information is then copied to the corresponding database on server 12 of a particular flight. Thereafter each passenger can modify that selection but in many cases would have no need to do so. A passenger would then automatically be played safety announcements, etc., before and after take-off in their chosen language without having to operate their monitor 20. Information concerning the preferred language can also be tagged according to the passenger's "frequent flyer" membership number or airline club membership number so that their language choice is preserved for future flights and automatically loaded into each subsequent aircraft's server 12.

Modifications within the scope of the invention may be readily effected by those skilled in the art. It is to be understood, therefore, that this invention is not limited to the particular embodiments described by way of example hereinabove.

The claims defining the invention are as follows:

1. A multi-language communication method for providing concurrently communications in at least one of a plurality of selectable languages from a centralized source located at a venue to each of a plurality of persons having respective identifiable physical locations relative to other of said plurality of persons in said venue, comprising:
   electronically providing to each of said persons, at a respective electronically identifiable physical location in said venue, access to a plurality of language options;
   electronically receiving at said centralized source, from each of one or more of said persons in said venue, an indication of a respective choice of language chosen by said respective person from said language options for said respective electronically identifiable physical location in said venue;
   storing at said centralized source said language choices in a database in conjunction with said respective electronically identifiable physical locations in said venue;
   retrieving, from said centralized source, a language choice of a person according to the respective electronically identifiable physical location of the person; and
   providing, using an application, an output to the person in the retrieved language choice at said respective electronically identifiable physical location in said venue on the basis of a real time translation into the retrieved language choice.

2. The method as claimed in claim 1, wherein those of said persons who do not choose a language are assigned a same language choice being a principal language.

3. The method as claimed in claim 2, wherein the principal language is selected based on the choices of language of the plurality of persons.

4. The method as claimed in claim 3, wherein the principal language is a language indicated by a majority of the plurality of persons who have indicated the respective choice of language.

5. A method as claimed in claim 1, wherein said application is an announcement system for making an announcement in the form of a public announcement over a public address system in the principal language; and
   providing the output comprises making said announcement available to each person who has indicated a language choice in the form of a personal announcement over a respective personal address system in said respective language choice retrieved from the centralized source;
   whereby a respective person who has chosen a language can access said personal announcement in their respective language choice by means of their respective personal address system.

6. A method as claimed in claim 1, wherein said application is an announcement system for making an announcement in the form of a public announcement by means of a public announcement system, wherein said announcement is presented by means of said public announcement system in at least each language choice.

7. A multi-language communication method for making an announcement, under centralized control, concurrently in at least one of a plurality of selectable languages to a plurality of persons, each person having a respective electronically identifiable physical location relative to other of said plurality of persons in a common venue, comprising:
   providing to each of said persons in said common venue electronic access to a plurality of language options from said centralized control;
   receiving under said centralized control from each of one or more of said persons in said common venue an electronic indication of a respective choice of language chosen by said respective person from said language options;
   electronically making said announcement in the form of a public announcement over a public address system in said common venue in a principal language which is a default language of the common venue; and
   electronically making said announcement available under said centralized control to each person in said common venue who has indicated a language choice in the form of a personal announcement over a respective personal address system in said respective language choice at said respective electronically identifiable physical location in said common venue;
   whereby a respective person who has chosen a language can access said personal announcement in their respective language choice by means of their respective personal address system at a respective electronically identifiable physical location at least one announcement being on the basis of a real time translation into said respective language of choice.

8. A method as claimed in claim 7, including making said respective language choices accessible by an attendant so that said attendant can anticipate the language needs of a respective person.

9. A method as claimed in claim 7, wherein said personal announcement comprises a prerecorded audio translation of said announcement in the respective language choice of a respective person, played over one or more personal loudspeakers located proximate said respective person.

10. A method as claimed in claim 9, wherein said personal announcement comprises a prerecorded audio translation of said announcement in the language choice of a respective person, accessible by means of a headphone or ear-piece output allocated to said respective person, whereby said respective person can access said personal announcement by means of a headset connected to said output.

11. A method as claimed in claim 7, wherein said announcement is an audio announcement and said method includes translating said announcement by real-time computer translation into the respective language choice of a respective person to form said personal announcement, and playing said personal announcement over one or more personal loudspeakers located proximate said respective person.

12. A method as claimed in claim 7, wherein said personal announcement comprises a prerecorded text translation of said announcement in the language choice of a respective person, accessible by means of a display allocated to said respective person, whereby said respective person can read said personal announcement on said display.

13. A method as claimed in claim 7, wherein said announcement is a text announcement and said method includes translating said announcement by real-time computer translation into the respective language choice of a respective person to form said personal announcement, and making said personal announcement accessible by means of a display allocated to said respective person, whereby said respective person can read said personal announcement on said display.

14. A method as claimed in claim 7, including making said announcement available to each of said persons who has not indicated a language choice in the form of a personal announcement over a personal address system in said principal language.

15. The multi-language communication method as claimed in claim 7, wherein the principal language is selected based on the choices of language of the plurality of persons in the common venue.

16. The multi-language communication method as claimed in claim 15, wherein the principal language is a language indicated by a majority of the plurality of persons who have indicated the respective choice of language.

17. A multi-language communication system for making an announcement, under centralized control, to a plurality of persons in a common venue in at least one of a plurality of selectable languages from a centralized source in said common venue to each of said plurality of persons at a respective electronically identifiable physical location relative to other of said plurality of persons in said common venue, comprising:
a database for storing a respective language choice of each of said persons on the basis of said respective electronically identifiable physical location in said common venue;
a public address system for making said announcement in the form of a public announcement in a principal language; and
a plurality of personal address systems, each for making said announcement available to a respective person, under centralized control, in the form of a personal announcement in the respective language choice of that respective person at a respective electronically identifiable physical location in said common venue;
a centralized control system in said common venue operable to select each of said personal announcements on the basis of said public announcement and said language choices, and to direct each of said personal announcements to the corresponding personal address system of each respective person at a respective electronically identifiable physical location in said common venue;
wherein said language choice of a respective person comprises a same language choice being said principal language where said person has not indicated a language choice, whereby each of said persons can access said personal announcement in their respective language choice, at least one announcement being on the basis of a real time translation into said respective language of choice.

18. A system as claimed in claim 17, including a real-time translation module for providing any one or more of: text to text, text to voice, voice to voice, and voice to text real-time translation, so that said system can provide real-time translations of said announcement.

19. A system as claimed in claim 18, wherein said module comprises a server provided with real-time translation software.

20. A system as claimed in claim 17, wherein said respective language choices are accessible by an attendant so that said attendant can anticipate the language needs of a respective person.

21. A system as claimed in claim 17, including a prerecorded audio translation of the announcement in each available language choice, and is configured to play the appropriate audio translation corresponding to the respective language choice of a respective person over one or more personal loudspeakers located proximate said respective person.

22. A system as claimed in claim 17, including a real-time translation module operable to prepare an audio translation of said announcement in each chosen language, said system being configured to play the appropriate audio translation corresponding to the respective language choice of a respective person over one or more personal loudspeakers located proximate said respective person.

23. A system as claimed in claim 17, including a real-time translation module operable to prepare a text translation of said announcement in each chosen language, said system being configured to display the appropriate text translation corresponding to the respective language choice of a respective person on a display allocated to said respective person.

24. A system as claimed in claim 17, including a console having a display and a data entry device for each of said persons for providing said language options to each of said persons and to allow each respective person to select said language option.

25. A system as claimed in claim 17, including a console having a display and a data entry device for each of said persons, each of said consoles providing access to a plurality of predefined service request options, so that each of said persons can request the corresponding service by means of said console.

26. The multi-language communication system as claimed in claim 17, wherein the principal language is selected based on the choices of language of the plurality of persons.

27. The multi-language communication system as claimed in claim 26, wherein the principal language is a language indicated by a majority of the plurality of persons who have indicated the respective choice of language.

28. A multi-language communication method for communicating with a plurality of passengers in a common venue, under centralized control, in at least one of a plurality of selectable languages from a centralized source in said common venue to each of said plurality of passengers having respective electronically identifiable physical locations relative to other of said plurality of persons in said common venue, comprising:
electronically providing to each of said passengers in said common venue access to a plurality of language options, at least one option being on the basis of a real time translation into a respective language of choice;
electronically receiving from each of one or more of said persons in said common venue an indication of a respective choice of language chosen by said respective person from said language options for delivery, under centralized control, at a respective electronically identifiable physical location in said common venue;
assigning to each of said passengers who has not chosen a language a same language choice being a principle language; and
providing, under centralized control, to each of said passengers who has chosen a language access to content in his or her respective language of choice at a respective electronically identifiable location in said common venue, and providing to each of said passengers who has not chosen a language access to content in the principle language.

29. A method as claimed in claim 28, wherein said content comprises any one or more selected from the set comprising: promotional material, educational material, entertainment, safety announcements, subtitles for movies and closed captioning.

30. A method as claimed in claim 28, including providing at least one announcement to each of said passengers by means of a personal address system, wherein said announcement is in the respective language of choice of each passenger or, or, if no language was chosen by a respective passenger, in a principal language.

31. The multi-language communication method as claimed in claim 28, wherein the principal language is selected based on the choices of language of the plurality of persons in the common venue.

32. The multi-language communication method as claimed in claim 31, wherein the principal language is a language indicated by a majority of the plurality of persons who have indicated the respective choice of language.

33. A multi-language communication system for communicating concurrently with a plurality of passengers in a common venue, under centralized control, in at least one of a plurality of selectable languages from a centralized source in said common venue to each of said plurality of passengers having respective electronically identifiable physical locations relative to other of said plurality of persons in said common venue, comprising:
 a database for storing a respective language choice of each of said passengers on the basis of said respective electronically identifiable physical locations in said common venue;
 a centralized control system in said common venue operable to retrieve said language choices from said database and operable to provide each of said passengers with access to content in his or her respective language of choice or, if no language was chosen by a respective passenger, in a same language being a principal language at a respective electronically identifiable physical location, at least one access being on the basis of a real time translation into a respective language of choice;
 a plurality of output devices, each assigned to a respective passenger for providing, under centralized control, said content to said respective passenger in his or her respective language of choice or, if no language was chosen by a respective passenger, in a principal language at a respective electronically identifiable physical location in said common venue.

34. A system as claimed in claim 33, wherein said respective language choices are accessible by a passenger attendant so that said attendant can anticipate the language needs of a respective passenger.

35. A system as claimed in claim 33, wherein said output device is a display, an audio output device, or both a display and an audio output device.

36. A system as claimed in claim 33, wherein said announcement comprises visual material displayable for each respective passenger on a display assigned to that respective passenger.

37. A system as claimed in claim 33, wherein said announcement comprises an audio announcement directed for each respective passenger to an audio output assigned to that respective passenger, whereby each passenger can listen to said announcement, such as by means of a headset.

38. A system as claimed in claim 33, including a public address system for making said announcement in the form of a public announcement to said passengers in said principal language.

39. A system as claimed in claim 33, wherein said system is operable to receive said language choices from an operator who has received the respective language choices from one or more of the passengers.

40. The multi-language communication system as claimed in claim 33, wherein the principal language is selected based on the choices of language of the plurality of persons.

41. The multi-language communication system as claimed in claim 40, wherein the principal language is a language indicated by a majority of the plurality of persons who have indicated the respective choice of language.

\* \* \* \* \*